(12) United States Patent
Nickel et al.

(10) Patent No.: US 9,624,983 B2
(45) Date of Patent: Apr. 18, 2017

(54) FRICTION ASSEMBLY

(71) Applicant: Miba Frictec GmbH, Laakirchen (AT)

(72) Inventors: Falk Nickel, Gmunden (AT); Andreas Promberger, Ebensee (AT)

(73) Assignee: Miba Frictec GmbH, Laakirchen (AT)

( * ) Notice: Subject to any disclaimer, the term of this patent is extended or adjusted under 35 U.S.C. 154(b) by 0 days.

(21) Appl. No.: 14/831,542

(22) Filed: Aug. 20, 2015

(65) Prior Publication Data

US 2016/0053824 A1 Feb. 25, 2016

(30) Foreign Application Priority Data

Aug. 22, 2014 (AT) .............................. A 50581/2014

(51) Int. Cl.
| | |
|---|---|
| *F16D 69/00* | (2006.01) |
| *F16D 13/52* | (2006.01) |
| *F16D 13/64* | (2006.01) |
| *F16D 55/36* | (2006.01) |
| *F16D 65/12* | (2006.01) |

(52) U.S. Cl.
CPC ............ *F16D 13/52* (2013.01); *F16D 13/648* (2013.01); *F16D 55/36* (2013.01); *F16D 65/122* (2013.01); *F16D 69/00* (2013.01)

(58) Field of Classification Search
CPC ........ F16D 69/02; F16D 2069/001–2069/005; F16D 2069/009; F16D 13/648; F16D 69/00

See application file for complete search history.

(56) References Cited

U.S. PATENT DOCUMENTS

| 2,927,673 A | 3/1960 | Sand |
| 3,073,424 A | 1/1963 | Russell |
| 3,927,241 A | 12/1975 | Augustin |

(Continued)

FOREIGN PATENT DOCUMENTS

| AT | 510 943 A1 | 7/2012 |
| DE | 1 575 906 B | 11/1970 |

(Continued)

OTHER PUBLICATIONS

Austrian Office Action in A 50581/2014, dated Jun. 10, 2015, with English translation of relevant parts.

(Continued)

*Primary Examiner* — Stacey Fluhart
(74) *Attorney, Agent, or Firm* — Collard & Roe, P.C.

(57) ABSTRACT

The invention relates to a friction assembly (1) comprising a first component (5) and a second component (8) and a plurality of inner discs (2) and a plurality of outer discs (3), wherein the inner discs (2) are arranged on the first component (5) and the outer disc (3) are arranged on the second component (8) and the inner discs (2) and the outer discs (3) are arranged alternately in axial direction (4), and wherein between the inner discs (2) and the outer discs (3) respectively at least one freely rotational friction ring (11) is arranged which has an opening (29) with an inner diameter (14), and wherein the inner disc (2) and/or the outer disc (3) can be adjusted relative to one another to form a friction connection with the friction rings (11) in axial direction (4). The freely rotating friction rings (11) are guided in the region of the inner diameter (14) on the first component (5).

9 Claims, 6 Drawing Sheets

(56) References Cited

U.S. PATENT DOCUMENTS

| | | | | |
|---|---|---|---|---|
| 3,948,364 | A | * | 4/1976 | Lowey ................ F16D 13/648 188/251 R |
| 5,176,236 | A | * | 1/1993 | Ghidorzi .............. F16D 13/648 188/218 XL |
| 5,373,928 | A | | 12/1994 | Werner et al. |
| 6,006,885 | A | | 12/1999 | Borgeaud et al. |
| 6,105,234 | A | | 8/2000 | Kremsmair et al. |
| 8,746,727 | B1 | | 6/2014 | Burton |
| 2005/0224310 | A1 | * | 10/2005 | Li ......................... F16D 13/64 192/113.36 |
| 2006/0102443 | A1 | | 5/2006 | Kinoshita et al. |
| 2013/0288003 | A1 | | 10/2013 | Foege et al. |

FOREIGN PATENT DOCUMENTS

| | | |
|---|---|---|
| DE | 2 340 464 B1 | 11/1974 |
| DE | 38 01 911 A1 | 8/1988 |
| DE | 37 12 898 A1 | 11/1988 |
| DE | 42 06 321 A1 | 9/1993 |
| DE | 601 33 393 T2 | 4/2009 |
| DE | 10 2009 040 129 A1 | 4/2010 |
| DE | 10 2009 046 513 A1 | 6/2010 |
| EP | 0 267 027 A2 | 5/1988 |
| EP | 0 790 426 A2 | 8/1997 |
| EP | 1 464 857 A1 | 10/2004 |
| EP | 2 843 253 A2 | 3/2015 |
| FR | 2 774 731 A1 | 8/1999 |
| JP | H 0484832 U | 7/1992 |
| JP | H 11-230196 A | 8/1999 |
| WO | 9618049 A1 | 6/1996 |
| WO | 2004/025136 A1 | 3/2004 |

OTHER PUBLICATIONS

Austrian Office Action in A 50580/2014, dated Jun. 10, 2015, with English translation of relevant parts.

* cited by examiner

FRICTION ASSEMBLY

CROSS REFERENCE TO RELATED APPLICATIONS

Applicant claims priority under 35 U.S.C. §119 of Austrian Application No. A 50581/2014 filed on Aug. 22, 2014, the disclosure of which is incorporated by reference.

The invention relates to a friction assembly comprising a first component and a second component and a plurality of inner discs and a plurality of outer discs, wherein the inner discs are arranged on the first component and the outer disc are arranged on the second component and the inner discs and the outer discs are arranged alternately in axial direction, and wherein between the inner discs and the outer discs at least one freely rotational friction ring is arranged, which comprises an opening with an inner diameter, and wherein the inner discs and/or the outer discs can be displaced relative to one another to form a friction connection with the friction rings in axial direction.

Multi-disc clutches and multi-disc brakes have already been described comprehensively in the prior art. The systems that are mostly used today comprise inner discs and outer discs which are arranged alternately in axial direction. The inner discs are arranged on an inner shaft and connected to the latter in a rotationally secure manner. The outer discs are arranged for example on an inner surface of a housing of the coupling and connected to the latter in a rotationally secure manner. To produce a frictional connection in the disc set the outer discs can be adjusted in axial direction relative to the inner discs—or vice versa. The frictional connection, which is necessary e.g. for torque transmission in the embodiment as a multi-disc clutch, is produced by friction linings. The friction linings are arranged either on the inner discs or the outer discs as separate friction linings and are connected to said discs in a rotationally secure manner.

In addition to said systems however systems have already been described in the prior art which comprise freely rotating rings or friction rings. In this case "freely rotating" means that the rings or friction rings are connected in a rotationally secure manner to an element of the clutch unlike the inner discs and the outer discs.

Thus for example DE 38 01 911 A1 describes an arrangement for a multi-disc clutch or multi-disc brake which are connected in a rotationally secure manner on their radially inner and outer edges alternately to a first and a second component and can be coupled together by inserting friction linings for a force-transmitting connection, wherein the friction linings are secured onto freely rotatably mounted support discs arranged between the discs.

DE 37 12 898 A1 describes a friction clutch for frictionally connecting a drive shaft to a driven shaft, comprising a first coupling body comprising a first coupling surface connected to the drive shaft, a second coupling body comprising a second coupling surface connected to the driven shaft, a friction body arranged between the coupling surfaces and an actuating element for pressing the coupling bodies together in the closed state of the friction clutch, wherein in the open state of the friction clutch the friction body is arranged loosely between the coupling surfaces. The outside diameter of the friction body is the same or slightly smaller than the inner diameter of the cylindrical inner surface of the gearbox housing, so that the friction body is thus arranged centrally in the gearbox housing and mounted in radial direction.

A similar multi-disc clutch is known from U.S. Pat. No. 6,006,885 A. The latter comprises freely rotating friction rings made from a carbon material which are guided on an inner surface of the outer discs.

FR 2 774 731 A1 also describes a multi-disc clutch with freely rotating friction rings arranged between the inner discs and the outer discs.

The underlying objective of the present invention is to improve a friction assembly of the aforementioned type with respect to the freely rotating friction rings.

Said objective is achieved with the aforementioned friction assembly in that the freely rotating friction rings are guided in the region of the inner diameter on the first component.

By means of the internal guiding of the friction rings compared to the external guiding a greater efficiency of the friction assembly can be achieved. Surprisingly, in conditions which are otherwise the same, internally guided friction rings have a greater friction value over the number of shift cycles than externally guided friction rings. However, this is associated with the disadvantage that the internally guided friction rings heat up more than externally guided friction rings. Furthermore, it was established that with internally guided friction rings the dragging torque can be reduced significantly compared to externally guided friction rings so that the power loss can be reduced significantly with the friction assembly according to the invention.

Preferably, the friction rings are arranged at a distance from a surface of the first component, wherein said distance is at least 0.05 mm and a maximum of 3 mm. In order to prevent the temperature increasing too much in the region of the friction rings, it is an advantage if the distance between the first component and the friction ring is at least 0.05 mm. If the distance is less than 0.05 mm, the friction ring sits more closely against the first component, whereby the guiding is improved but because of the relative movement of the first component and friction ring more heat is created. Furthermore, a distance between the first component and the friction ring of more than 3 mm can result in a walking movement of the friction ring, whereby the latter is subjected to greater (mechanical) load which can result in the destruction of the friction ring.

According to a further embodiment variant of the friction assembly it is possible that the friction rings have a cross-sectional tapering in the region of the opening. In this way in the region of the guide of the friction rings at least one lubricant pocket can be provided, whereby in this area there can be better cooling of the friction rings and it is thus easier to avoid overheating in the region of the guide. The friction rings are thus protected more effectively from destruction, for example as a result of walking movements.

In order to improve the lubricant guiding in this area it is possible to provide a transition between two different cross-sections in the region of the cross-sectional tapering with at least one rounding.

In addition, the friction rings can be made from at least one resin, containing at least one additive, or from a sintered material, and the cross-sectional tapering is formed by a compacted area. It is an advantage that the friction ring additionally has greater mechanical strength over the compacted area. This advantage outweighs the associated disadvantage that the area of the friction ring mainly available for the friction connection, i.e. the area which is not compacted or is less compacted, is reduced. A positive secondary effect of this is that the compressibility of the friction ring can be adjusted more effectively, whereby the frictional behavior of the friction ring can be adapted more effectively to the respective counter-disc. By means of its improved mechanical stability the friction ring can have a long lifespan. It is also an advantage in this case that the friction ring can be produced to have a relatively high strength from only one material, whereby the friction ring can be produced more easily accordingly, as the production method comprises fewer steps. By using only one material the homogeneity of the friction ring can be improved throughout its volume, i.e. the homogenous distribution of the individual components of the material can be improved. This in turn has a positive effect on the frictional behavior of the friction ring. By using only one material there is no risk that when the frictional surface has been used up the counter-disc rubs against a metallic support which would again damage the counter-disc.

According to another embodiment variant of the friction assembly it is also possible that the surface facing the outer disc and the surface of the friction ring facing the inner disc at least in the area of the non-compacted or less compacted areas has an arithmetic average roughness value Ra according to DIN EN ISO 4287:1998 of a maximum of 12.5 µm. With roughness values Ra of more than 12.5 µm an improved friction can be achieved, and in tests it was observed that at roughness values Ra of more than 12.5 µm the surface(s) of the friction ring in the region of the guide of the friction ring became frayed which in the end results in the destruction of the friction ring.

To improve the stability of the friction ring, in particular in the region of the inner guide, it a preferable to have a ratio of an outside diameter to the inner diameter of the friction ring of at least 1.2.

According to another embodiment variant of the friction assembly it is possible that the friction rings are formed by a support ring and friction segments arranged thereon, wherein the support ring has a thickness in axial direction which corresponds to the thickness of the cross-sectional tapering. In this way the cross-sectional tapering can be produced simply and without subsequently machining the friction ring. In addition, this has the advantage of reducing the cost in that the expensive friction segments do not need to be produced in one piece, whereby the amount of waste created when producing one-piece friction rings can be reduced. The friction rings thus consist of a support structure, namely the support ring, and a frictional structure, namely the friction segments.

It is also possible for at least two friction rings to be arranged between the inner discs and the outer discs respectively, wherein the friction rings are connected to one another. In this way the compressibility of the friction ring can be adjusted more effectively, whereby the behavior of the inner guiding of the friction ring can be influenced.

In a particular embodiment variant of the friction assembly it is also possible to have three connected friction rings between the inner discs and the outer discs, wherein the opening of the middle friction ring for forming the cross-sectional tapering has a smaller inner diameter than the openings of the two outer friction rings. As in the embodiment variant of the friction assembly with the support ring according to the invention, with this embodiment variant the cross-sectional tapering in the region of the inner guide can be produced easily and without subsequent costly mechanical processing.

For a better understanding of the invention the latter is explained in more detail with reference to the following Figures.

In a simplified, schematic representation.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 1:
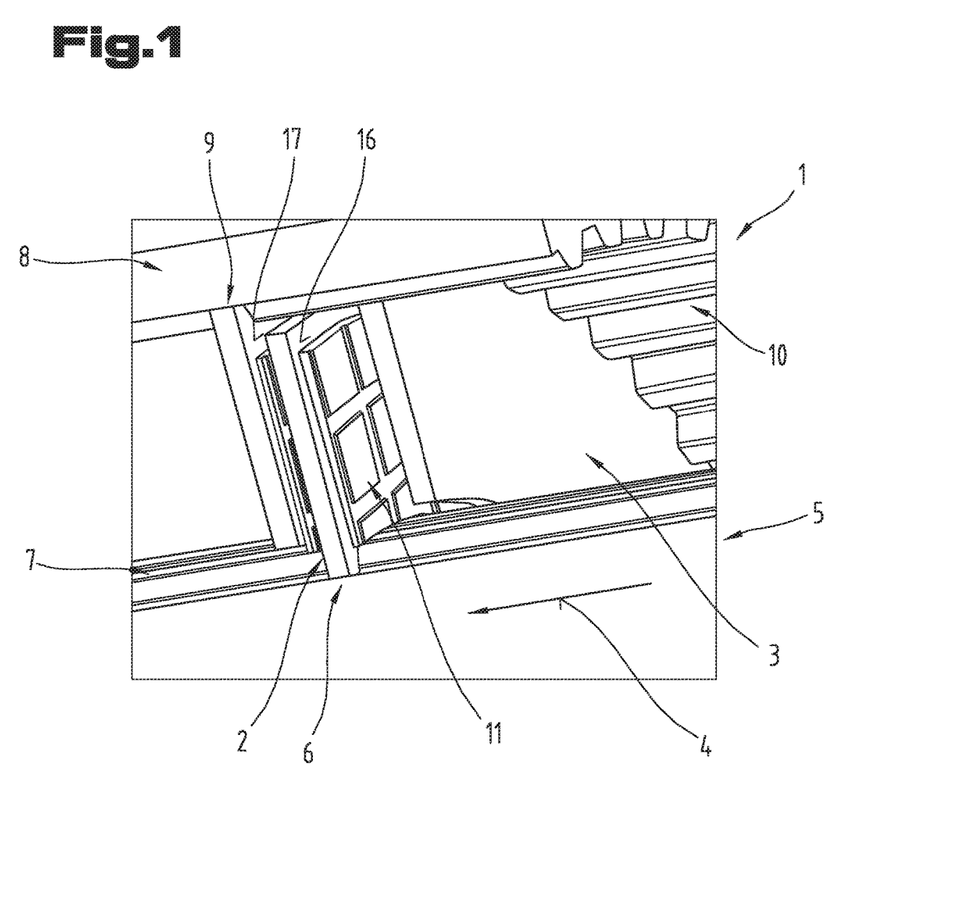
FIG. 1 shows a section of a friction assembly with internal guiding in an oblique view.

FIG. 1 shows a section of a first embodiment variant of a friction assembly 1 in perspective view. The friction assembly 1 comprises a plurality of inner discs 2 (only one is shown in FIG. 1) and a plurality of outer discs 3, wherein in an axial direction 4 of the friction assembly 1 the inner discs 2 and the outer discs 3 are arranged alternately, so that in axial direction 4 an inner disc 2 follows an outer disc 3 and is followed by an outer disc 3, etc.

Although FIG. 1 shows only an inner disc 2 and two outer discs 3 it should be noted that this number of discs is not considered to be restrictive. Rather, the friction assembly 1 can comprise for example between one and fifteen inner discs 2 and between one and fifteen outer discs 3. The exact number of inner discs 2 and outer discs 3 corresponds to the respective use of the friction assembly 1.

The friction assembly 1 is in particular a multi-disc clutch. However, it is also possible to design the latter as a multi-disc brake. The friction assemblies of this kind are known from the prior art, so that reference is made to further details, such as e.g. activating elements etc.

The inner discs 2 are connected in a rotationally secure manner to a first component 5, for example a shaft. In addition, the inner discs 2, which are designed in the form of circular ring discs, can have an internal toothing 6 on a radially inner end face that engages in an external toothing 7 of the first component 5. The inner discs 2, which have a corresponding opening, project over the first component 5 in radial direction and are fitted in particular onto the first component 5.

The outer discs 3 are connected in a rotationally secure manner to a second component 8, which is designed for example to be at least approximately sleeve-like. In addition, the outer discs 3, which like the inner discs 2 are designed as circular ring-like discs, can have an outer toothing 9 on a radially outer end face which engages in an internal toothing 10 on a radially inner surface of the second components 9. The outer discs 3 thus project from the inner surface of the second component 8 radially inwards in the direction of the first component 5. The outer discs 3 do not bear against the first component 5 but end at a distance from the latter. Likewise the inner discs 2 do not bear against the inner surface of the second component 8 but end at a distance from the latter.

At least one friction ring 11 is arranged between each inner disc 2 and each outer disc 3 so that the inner discs 2 are separated by the friction rings 11 from the outer discs 3 in axial direction 4 of the friction assembly 1.

For further details about the friction rings 11 reference is made to the following description.

Preferably, the inner discs 2 and the outer discs 3 are made of steel. However, they can also be made from another suitable material, in particular metal. The inner discs 2 and the outer discs 3 can be produced for example by punching, laser cutting or the like. Preferably, they have an arithmetic average roughness value Ra according to DIN EN ISO 4287:1998 of a maximum of 1 µm, in particular a maximum of 0.6 µm, if the friction rings 11 are made from a resin-bonded composite material, as explained further in the following, or have an arithmetic average roughness value Ra according to DIN EN ISO 4287:1998 of a maximum of 2 µm, in particular a maximum of 1.2 µm, if the friction rings 11 are made from a sintered material.

==The friction rings 11 are guided internally, i.e. are centered internally. In addition, the also circular ring-like and at least almost disc-like friction rings 11 have an outside diameter 12 (FIG. 2) which is smaller than an inner diameter of the second component 8 in the region of a radially outer end face 13 of the friction rings 11. In a specific example embodiment of the friction assembly 1 according to FIG. 1 said inner diameter of the second component 8 is the outside diameter of the internal toothing 10 of the second component 8.

In particular, the outside diameter 12 of the friction rings 11 can be at least 5%, in particular at least 7%, smaller than the inner diameter of the second component 8, i.e. in the specific example embodiment of the friction assembly 1 according to FIG. 1 than the outside diameter of the internal toothing 10 of the second component 8.

The outside diameter 12 of the friction rings 11 is dimensioned so that the friction rings 11 do not bear against the surface of the second component 8.

An inner diameter 14 (FIG. 2) of an opening of the friction rings 11 is dimensioned however so that the latter is the same size or only slightly larger than the outside diameter of the first component 5 in the region of a radially inner end face 15 of the friction rings 11. In the specific example embodiment of the friction assembly 1 according to FIG. 1 said outside diameter of the first component 5 is the outside diameter of the external toothing 7 of the first component 5.

Figure 2:
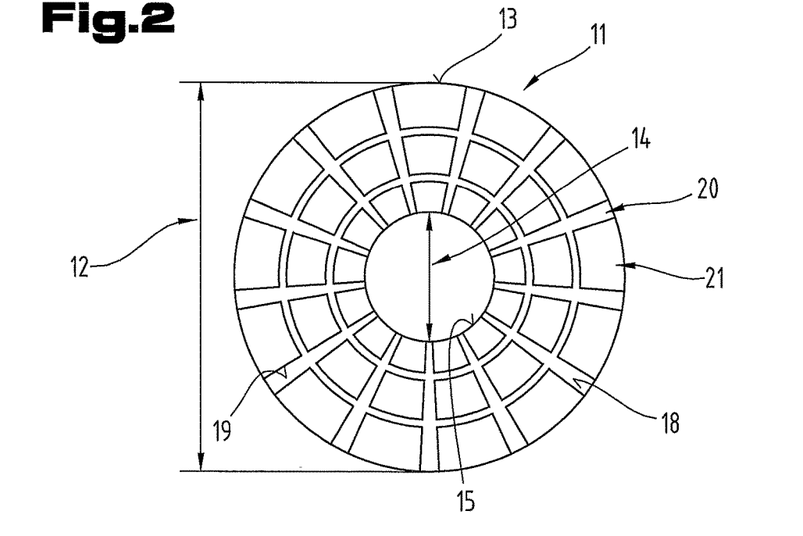
FIG. 2 shows an embodiment variant of a friction ring with a view of the frictional surface.

The term "slightly larger" with regard to the inner diameter 14 of the friction rings 11 means that said inner diameter 14 is a maximum of 2%, in particular a maximum of 1%, greater than said outside diameter of the first component 5.

The friction rings 11 thus bear either on the first component 5 or are only slightly spaced apart from said first component 5.

The friction rings 11 are thus guided and are arranged in any case to be freely rotating in the friction assembly 1, i.e. they do not have a rotationally secure connection to the first component 5 or a rotationally secure connection to the second component 8 of the friction assembly 1. Furthermore, they are not connected rotationally securely to the inner disc 2 and the outer disc 3.

As already known the inner discs 2 are adjustable relative to the outer discs 3 or the outer discs 3 are adjustable relative to the inner disc 2 in axial direction 4 so that surfaces 16 of the inner disc 2 and surfaces 17 of the outer disc 3 are in contact with the friction rings 11 and thus in the closed position of the coupling for the transmission of torque from the first component 5 to the second component 8 of the friction assembly 1—or vice versa—form a frictional connection with the friction rings 11. (In the configuration of the friction assembly 1 as a brake the friction connection is formed between the discs and the friction rings 11 in a similar manner).

FIG. 2 shows an embodiment variant of a friction ring 11.

The friction ring 11 is designed in one piece, i.e. that is does not have a separate support element on which friction linings are arranged.

The friction ring 11 comprises a matrix, in which at least one additive is distributed, in particular distributed at least almost homogenously. The term "at least almost homogenously" means that in some areas it is possible to have differences in concentration on the individual components which result from the industrial production process.

However, it is also possible that at least one additive is deliberately distributed non-homogenously, in order to adjust the property profile of the friction ring 11 to the respective purpose. In the preferred embodiment variant of the friction ring 11 the latter has at least almost a homogenous distribution of the at least one additive in the matrix.

The matrix of the friction ring 11 is preferably formed by a resin. For the resin it is possible to use for example a phenolic resin, a phenolic/formaldehyde resin, an epoxy resin, a melamine resin, a cyanate resin, a silicone resin, etc. or a resin mixture. In particular, a heat-resistant resin is used with a heat resistance of at least 200° C., for example an epoxy resin with a heat resistance of 200° C. or a silicone-like resin with a heat resistance of 270° C.

The resin is used as a bonding agent in order to bind together the particles or fibers of the at least one additive and thus bind them into the friction ring 11.

The amount of resin on the friction ring 11 can be between 15 wt. % and 85 wt. %, in particular between 40 wt. % and 75 wt. %.

The at least one additive can be formed by a fiber material, such as for example paper fiber, carbon fiber, aramid fiber etc. In particular, the at least one fiber material is impregnated with the resin.

If paper is used as the fiber material, the latter preferably has a grammage selected from a range with a lower limit of 260 g/m$^2$ and an upper limit of 1,400 g/m$^2$.

Of course, the matrix can also contain various, standard auxiliary materials and processing aids.

If necessary, the friction rings 11 can also include, i.e. in the matrix, frictional particles such as e.g. $SiO_2$, $Al_2O_3$, etc. The friction particles preferably have an average size of between 10 µm and 100 µm, as in this way it is possible to influence the compression of the friction ring 11.

In particular, the friction particles can be added in an amount which is selected from a range with a lower limit of 2 wt. % and an upper limit of 20 wt. %, preferably from a range with a lower limit of 5 wt. % and an upper limit of 10 wt. %.

All of the details regarding the composition of the friction ring 11 or the friction rings 11—preferably all of the friction rings 11 in the friction assembly 1 have the same structure and the same composition—relate to the total weight of the friction ring 11.

In addition to the formation of the friction ring 11 as a composite material with a resin matrix the friction ring 11 can also be made from a sintered material, for example with a metal matrix of copper, which contains if necessary at least one further metal, such as for example iron, or another additive, such as e.g. silicon, a silicate additive, selected in particular from a group comprising mica, feldspar, diatomaceous earth, mullite, silicon dioxide, solid lubricants, such as e.g. graphite, $MoS_2$, etc., hard particles, such as corundum, glass, aluminum oxide ($Al_2O_3$), and mixtures thereof.

The amount of the at least one additive in the sintered friction ring can be selected from a range with a lower limit of 5 wt. % and an upper limit of 35 wt. %. The remainder is formed by the matrix.

The friction ring 11 has on a surface 18, which in the friction assembly 1 faces the adjacent inner disc 2, and on a surface 19, which in the friction assembly 1 faces the adjacent outer disc 3, at least one compacted area 20 and at least one non-compacted area or an area 21 that is less compacted than the compacted area 19.

It should be mentioned at this point that this embodiment of the friction ring 11 with the compacted area(s) 20 and the non-compacted or less compacted area(s) 21 is preferred, as in this way the friction rings 11 can have a greater mechanical stability. However, friction rings 11 can also be used which do not have such a structure with compacted areas 20 and non-compacted or less compacted areas 21 but have an at least almost identical density over the whole friction ring 11.

If only one compacted area 20 is formed for each surface 18, 19 of the friction ring 11 the latter can be for example circular and thus separate the non-compacted or less compacted areas 21 of a surface 18, 19.

In the preferred embodiment variant of the friction ring 11 however a plurality of compacted areas 20 are formed, distributed evenly in particular over the surfaces 18, 19, as shown for example in FIG. 2.

The less compacted areas 21 can have a density for example which is 10% to 90° A), in particular 20% to 70%, lower than the density of the compacted areas 20. For example the non-compacted areas 21 can have a density which is selected from a range with a lower limit of 0.9 g/cm$^3$ and an upper limit of 2.4 g/cm$^3$, in particular selected from a range with a lower limit of 1.2 g/cm$^3$ and an upper limit of 2.2 g/cm$^3$.

The compacted areas 20 can have a density for example, which is selected from a range with a lower limit of 3 g/cm$^3$ and an upper limit of 8 g/cm$^3$, in particular selected from a range with a lower limit of 4 g/cm$^3$ and an upper limit of 7 g/cm$^3$.

Figure 3:
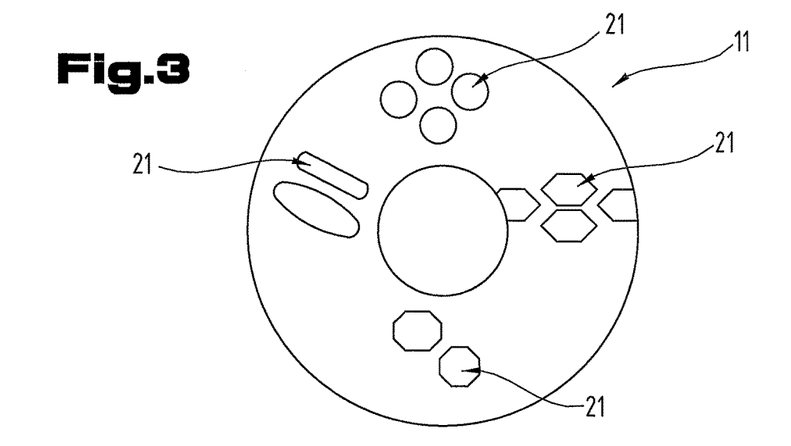
FIG. 3 shows various different embodiment variants of a friction ring with a view of the frictional surface.

The non-compacted or less compacted areas 21 can be square—as viewed in a plan view of the surfaces 18, 19—as shown in FIG. 1, or trapezoidal, as shown in FIG. 3. However, other configurations are possible, as shown in FIG. 3, which shows a plurality of different embodiments of the friction ring 11. For example, the non-compacted or less compacted areas 21 can be at least approximately elliptical, at least approximately circular, hexagonal or octagonal or generally polygonal. It is also possible for the non-compacted or less compacted areas 21 to be circular (not shown).

On the formation of a waffle pattern with square compacted areas 20, as shown in FIG. 1, it is preferable if the edge lengths of the square are a maximum of 4 mm, for example 0.75 mm, as in this way the stability of the friction ring 11 can be improved.

Preferably, the non-compacted or less compacted areas 21 on both surfaces 18, 19 of the friction ring 11 have the same shape. It is also possible however to design the non-compacted or less compacted areas 21 differently on the surface 18 than on the surface 19, for example with a different geometry and/or different size.

As shown in particular in FIG. 2 at least individual, preferably all or a plurality, i.e. more than 50%, in particular more than 60%, of the non-compacted or less compacted areas 21 can be surrounded annularly by the compacted areas 20, so that the non-compacted or less compacted areas 21 are only arranged in discrete areas on the surfaces 18, 19 of the friction ring 11. However, as shown in FIG. 2 or FIG. 3 if the non-compacted or less compacted areas 21 to the end faces 13, 17 of the friction ring 11 are arranged extending to the radially outer edge and/or to the radially inner edge of the friction ring 11, said non-compacted or less compacted areas 21 are of course not surrounded completely and enclosed by the compacted areas 20.

According to a preferred embodiment variant it is also possible for the non-compacted or less compacted areas 21 to each have an area of a maximum of 2 cm$^2$, in particular a maximum of 1.6 cm$^2$. In this case all non-compacted or less compacted areas 21 on a surface 18, 19 can be same size, or as shown for example in FIG. 2, the non-compacted or less compacted areas 21 of a surface 18, 19 can have a different area expansion, for example get smaller from the radial outer end face 13 in the direction of the radial inner end face 17 of the friction ring 11.

It should be mentioned at this point that it is possible to provide both non-compacted areas 21 and areas 21 that are less compacted than the compacted areas 20 on at least one of the surfaces 18, 19, preferably on both, adjacent to the compacted areas 20 in order to adjust the compressibility of the friction ring 11 to a desired degree.

The compacted areas 20 can be designed to be at least approximately planar, in particular in a plane, with the non-compacted or less compacted areas 21. In addition, in the areas of the surfaces 18, 19 of the friction ring 11 in which the compacted areas 20 are to be formed, there can be more material so that when compacting said areas a planar design can be achieved.

Figure 4:
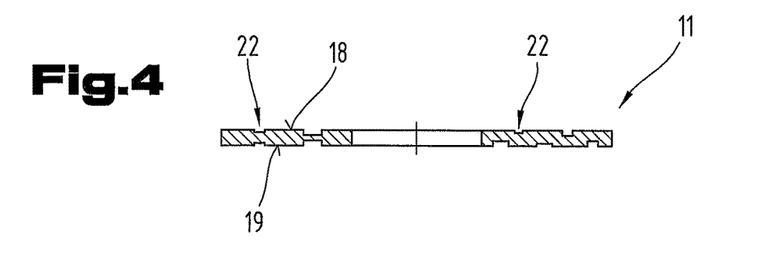
FIG. 4 shows a friction ring in side view with compacted areas in the form of grooves.

In the preferred embodiment variant of the friction ring 11 the compacted areas 20 can be depressed relative to the non-compacted or less compacted areas 21, in particular are groove-like, as shown for example in FIG. 4. The grooves 22 in the surfaces 18, 19 of the friction ring 11 can be formed by a suitable press tool, wherein the friction ring 11 is compressed between two press punches which have webs at the points where the compacted areas 20 are to be formed, which webs are pushed into the friction ring 11 and thus produce the compaction. In principle however, other methods of producing the grooves 22 are possible. For example, the latter can be produced by means of machining methods, e.g. cutting.

FIG. 4 shows two embodiment variants of the friction ring 11. On the left part of FIG. 4 the grooves 22, i.e. the compacted areas 20, are arranged exactly opposite one another in the surfaces 18, 19, i.e. are congruent. On the right part of FIG. 4 the grooves 22 in the surface 18 are arranged offset in circumferential direction of the friction ring 11 relative to the grooves 22 in the surface 19 so that the grooves 22 no longer overlap exactly. With the latter embodiment variant it is possible that the compacted areas 20 also support the non-compacted or less compacted areas 21 when closing the friction assembly 1. In this way, the compressibility of the friction ring 11 can be adjusted, as by offsetting the compacted areas 20 locally different densities can be produced. The offset can be selected for example from a range of 5% to 50% of the extension of the respective non-compacted or less compacted area 21 adjoining the compacted area 20 in circumferential direction.

The embodiment variants of the friction ring 11 according to FIG. 4 are not only possible with the grooves 22 as compacted areas 20 but are considered in general as the compacted areas 20, i.e. even if the compacted areas 20 are designed to be at least approximately to be planar or in a plane with the non-compacted or less compacted areas 21, as explained above.

Figure 5:
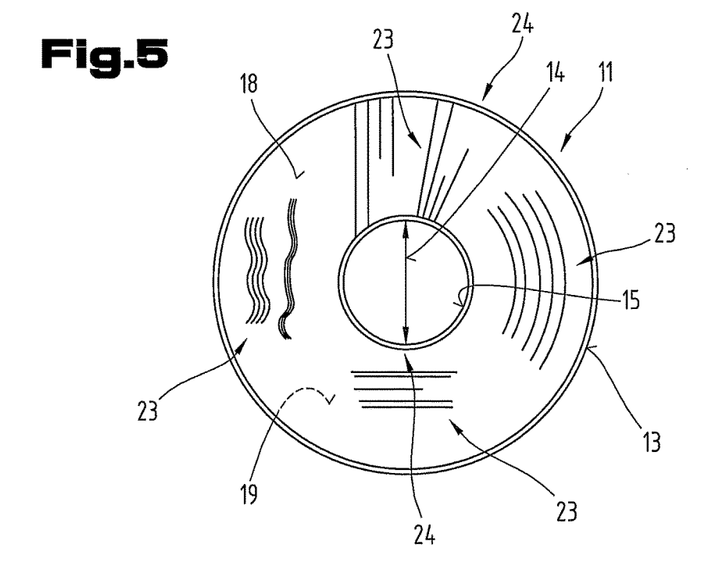
FIG. 5 shows further embodiment variants of a friction ring in a view of the frictional surface with a preferred orientation of fibers.

FIG. 5 shows further embodiment variants of the friction ring 11. The friction ring 11 consists in addition to the matrix of at least one additive, as already explained above. Said additive or at least one of the additives can be formed by fibers 23, for example carbon fibers or cellulose fibers, wherein in the latter case the additive or at least one of the additives is preferably paper, as usually used in friction linings. It is possible for at least 50% of the fibers 23, in particular at least 70% of the fibers 23, relative to the total amount of fibers 23 in the friction ring 11, to be oriented in the same direction at least approximately. This orientation of the fibers 23 depending on the setting of the desired mechanical properties of the friction ring 11 can be for example in radial direction or in circumferential direction or linearly in the direction of a tangent or wave-like, as shown in FIG. 5. It is also possible that the fibers 23 are oriented in several directions at least approximately in the same direction, wherein a first proportion of the fibers 23 are oriented in one direction and a second proportion of the fibers 23 are oriented in another direction. It is thus also possible that the proportion of fibers 23 are oriented differently in the area of the surface 18 of the friction ring 11 than the proportion of fibers 23 in the region of the surface 19.

FIG. 5 shows a further embodiment variant of the friction ring 11, in which the at least one additive or at least one of the additives is formed by a wire-like reinforcing element 24, which is arranged in the region of the radial outer end face 13 and/or in the region of the radial inner end face 17 of the friction ring 11. The reinforcing element 24 or the reinforcing elements 24 can be arranged in the end face 13 and/or 17 or slightly spaced apart from the latter. The term "slightly" means that the reinforcing element 24 is arranged at a distance from the respective end face 13, 17 which corresponds to a maximum of 10%, in particular a maximum of 5%, of the outside diameter 12 (FIG. 2) of the friction ring 11 in the case of the radially outer reinforcing element 24 and which corresponds to a maximum of 10%, in particular maximum of 5%, of the inner diameter 14 of the friction ring 11 in the case of the radially inner reinforcing element 24.

Figure 6:
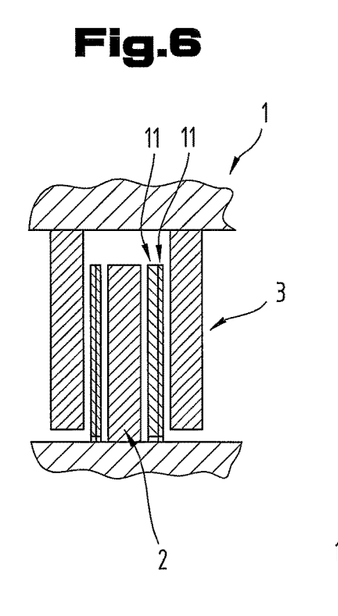
FIG. 6 shows a section of an embodiment variant of the friction assembly in cross-section with more than one friction ring between the outer and inner discs.

As shown in FIG. 6, according to another embodiment variant of the friction assembly 1 for adjusting the compressibility at least two friction rings 11 are arranged respectively between the inner discs 2 and the outer discs 3, wherein the friction rings 11 are connected to one another, for example are adhered to one another.

Figure 7:
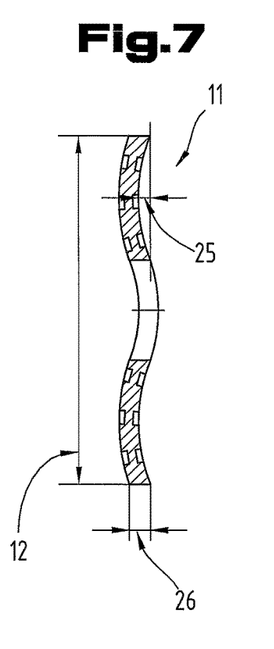
FIG. 7 shows a wave-like friction ring in lateral cross section.

The friction ring 11 can be designed to be planar—apart from the grooves 22. It is also possible according to a further embodiment variant of the friction ring 11 to deliberately design the latter to be wave-like, as shown in FIG. 7. A maximum depth 25 of the shaft waves can be selected from a range of 1% to 80%, in particular from a range of 20% to 70%, of a thickness 26 of the friction ring 11.

It is also possible that the wave form in relation to the outside diameter 12 of the friction ring 11 is not greater than 5%, in particular not greater than 4%. The wave form can be made in the friction ring 11, for example during the hardening process of the resin which is used for the friction ring 11.

In all of the embodiment variants of the friction ring 11 the thickness 26 can be selected from a range of 0.25 mm to 1.75 mm, in particular from a range of 0.4 mm to 1.5 mm.

Figure 8:
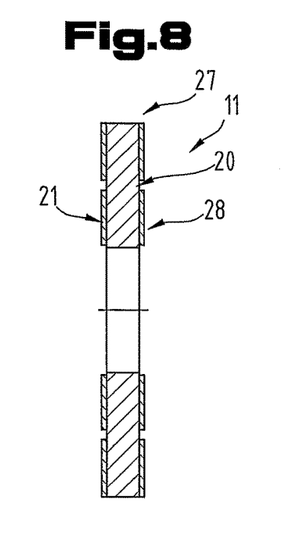
FIG. 8 shows a further embodiment variant of a friction ring in lateral cross section with a support element and friction segments arranged thereon.

Although the one-piece embodiment of the friction ring 11 is preferred, according to further embodiment variant of the friction ring 11 shown in FIG. 8 it is possible for the friction rings 11 to be formed by a support ring 27 and friction segments 28 arranged thereon, the support ring 27 being made from a resin-impregnated paper. The friction segments 28 also consist of at least one resin as a matrix, containing at least one additive, as explained above, and are connected to the support ring 27. The support ring 27 and friction segments 28 can be joined together by the at least one resin, wherein preferably the same resin is used for the support ring 27 and the friction segments 28.

The friction segments 28 can be designed with respect to their form and size according to the non-compacted or less compacted areas 21, as explained above. However, it is also possible for the friction segments 28 to have more than one non-compacted or less compacted area 21.

The compacted areas 20 are preferably formed by the support ring 27. However, it is also possible for the compacted areas 20 to be formed on the friction segments 28.

In all of the embodiment variants of the friction ring 11 at least the non-compacted or less compacted areas 21 have a porosity which is at least 20% and a maximum of 80%, in particular at least 40% and a maximum of 80%. It is thus also possible that the compacted areas 20 have this porosity. The porosity is defined here as the ratio of the total density of the material of the friction ring 11 to its actual density. By means of the porosity it is possible to influence the lubricant take up of the friction ring 11 and the lubricant guiding and thereby the cooling of the friction ring 11.

It should be mentioned that in the preferred embodiment variant of the friction assembly 1 the friction ring 11 is wet-running, i.e. is wetted with a lubricant.

It is also preferred in all of the embodiment variants of the friction ring 11 if the ratio of the outside diameter 12 to the inner diameter 14 of the friction ring 11 is at least 1.2, in particular at least 1.5.

In addition or alternatively to this it is preferable if in all of the embodiment variants of the friction ring 11 the surface 18 and/or surface 19 at least in the non-compacted or less compacted areas 21 has or have an arithmetic average roughness value Ra according to DIN EN ISO 4287:1998 of a maximum of 12.5 µm, in particular a maximum of 9.8 µm.

For the internal centering of the friction rings 11 in the friction assembly 1, as shown in FIG. 1, it is an advantage, if the friction rings 11 are arranged at a distance between the radially outer surface of the first component 5, in particular the shaft, which is at least 0.05 mm and a maximum of 3 mm.

If a resin is used as the matrix of the friction ring 11 the latter can also be carbonized.

Preferably, the composition of the friction ring 11 is selected so that the latter has a thermal conductivity which at 20° C. is at least 0.1 W/mK, in particular at least 0.5

W/mK, preferably at least 2 W/mK. Said thermal conductivity can be achieved by using at least one metal material and/or carbon fibers, but also by having a suitably high density of the friction ring 11 at least in the compacted areas 20, possibly also in the non-compacted or less compacted areas 21. An example composition comprises 35 wt. % to 45 wt. % cotton, 10 wt. % to 15 wt. % graphite, 10 wt. % to 15 wt. % glass fibers, 10 wt. % to 15 wt. % carbon fibers, 5 wt. % to 15 wt. % latex and 5 wt. % to 8 wt. % calcium silicate.

For high thermal conductivity it is an advantage if the proportion of graphite and/or carbon fibers is set to be greater. Furthermore, for low thermal conductivity it is an advantage if the proportion of cotton fibers is low and the proportion of glass fibers and/or carbon fibers is greater.

Preferably, the friction ring 11 has a thermal expansion in the range of $-1.0$ E-6 to $-5.0$ E-6 1/K at temperatures in the range of 100° C. to 200° C. This can be achieved e.g. by using carbon fibers as at least one additive. An example composition comprises 15 wt. % to 25 wt. % cotton, 10 wt. % to 15 wt. % graphite, 20 wt. % to 25 wt. % glass fibers, 20 wt. % to 25 wt. % carbon fibers, 5 wt. % to 15 wt. % latex and 5 wt. % to 8 wt. % calcium silicate.

In this way the friction ring 11 cannot expand or cannot expand much with an increase in temperature. The friction ring 11 can be guided outwardly (FIG. 1) or inwardly (FIG. 2) according to the use. To ensure that the friction ring 11 does not produce a walking movement during the rotation, it is an advantage if the friction ring 11 has no play or as little play as possible, as explained above. If because of the temperature the expansion is greater than the tolerance level it can result in the destruction of the friction ring 11. This can be prevented by means of the preferred thermal expansion of the friction ring 11.

It is also preferable in all of the embodiment variants if the Poisson ratio, i.e. the relative expansion of the friction ring 11 during pressure loading in radial direction, is not greater than 0.1 to 0.3, in particular is not greater than 0.2. In this way it is possible to prevent that because of the pressure acting on the friction ring 11 when closing the friction assembly 1 the expansion being greater than the tolerance. This can prevent the destruction of the friction ring 11. The Poisson ratio can be determined according to DIN 51909 (1998) or DIN 51045 or DIN EN 821-1 (1995) or DIN V ENV 1159-1 (1993).

Preferably, the friction ring 11 has the same tribological behavior on both surfaces 17, 18.

The friction ring 11 is preferably used in applications in which
 the maximum pressure is not greater than 10 N/mm$^2$,
 the sliding speed is not greater than 50 m/s,
 the energy per gearshift is not greater than 5 J/mm$^2$. The details regarding area relate to the gross surface area.

Figure 9:
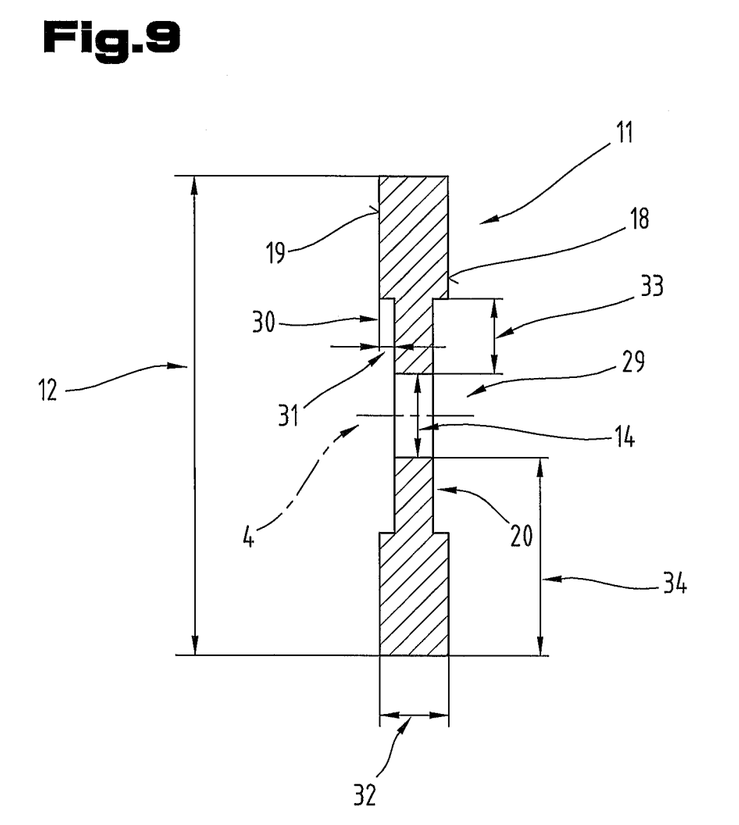
FIG. 9 shows a further embodiment variant of the friction ring in lateral cross section.
Figure 10:
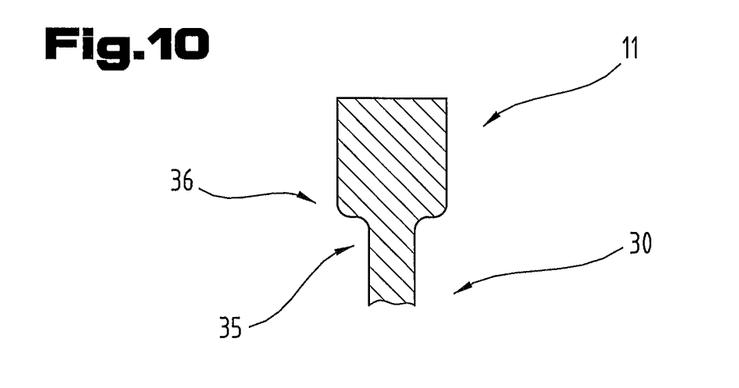
FIG. 10 shows a section of an embodiment variant of the friction ring according to FIG. 9 in lateral cross section.

FIGS. 9 and 10 show additional and possibly independent embodiments of the friction assembly 1, i.e. the friction ring 11 of the friction assembly 1, wherein the same reference numerals and components names are used for the same parts as in FIGS. 1 to 8. To avoid unnecessary repetition reference is made to the detailed description relating to FIGS. 1 to 8.

In this embodiment variant the friction ring 11 has a cross-sectional tapering 30 in the region of an opening 29, through which, as explained above, the first component 5 (FIG. 1) projects, i.e. in the region of the inner guide. Said cross-sectional tapering 30 is used principally for supplying a lubricant to the area of the inner guide of the friction ring 11.

Preferably, the cross-sectional tapering 30 is formed on both sides, i.e. on both surface 18 and on surface 19 of the friction ring 11. However, it is also possible for said cross-sectional tapering 30 to be formed in only one of the two surfaces 18, 19 of the friction ring 11. Said embodiment variant of the friction ring 11 can be used in particular if a plurality of friction rings 11 are arranged respectively between an inner disc 2 and an outer disc 3 (FIG. 1) and in particular are connected together.

Preferably, the cross-sectional tapering 30 in axial direction 4 has a width 31 which is between 1% and 30%, in particular between 4% and 20%, of a total width 32 of the friction ring 11 in axial direction 4.

It is also preferable if a height 33 of the cross-sectional tapering 30 in radial direction is between 1% and 20%, in particular between 5% and 15%, of a total height of the friction ring between the outside diameter 12 and the inner diameter 14 of the friction ring 11.

The cross-sectional tapering 30 extends along the circumference of the opening 29 preferably continuously and without interruption.

The cross-sectional tapering 30 can be formed by compacting this area, in particular if the friction ring 11 is made from at least one resin, containing at least one additive, or a sintered material, whereby the friction ring 11 can be made in one piece. In addition, in this way it is possible to achieve a mechanical improvement of the loadability of the friction ring 11 in the region of the inner guide through this compacted area 20 within the meaning of the above explanations relating to FIGS. 1 to 8.

As explained above, it is also possible for the friction ring 11 to consist of the support ring 27 with friction segments 28 arranged thereon. In this case it is possible that the support ring 27 has a thickness in axial direction which corresponds to the total width 32 of the friction ring 11 minus the width 31 of the cross-sectional tapering 30 or, if the friction ring 11 has cross-sectional taperings 30 on both sides, minus the widths 31 of the two cross-sectional taperings 30. The support ring 27 thus does not have any friction segments 28 in the region of the cross-sectional tapering 30.

However, it should be noted that it is also possible to design the friction ring 11 so that the friction segments 28 extend into the area of the cross-sectional tapering(s) 30 and the cross-sectional tapering(s) 30 are formed by a compacted area 20 of the friction segments 28.

According to another embodiment variant of the friction assembly 1, as also explained above, three friction rings 11 are arranged respectively between the inner discs 2 and the outer discs 3 (FIG. 1), the friction rings 11 being connected together. The opening 29 of the middle friction ring 11 can in this case have a smaller inner diameter to form the cross-sectional tapering 30 than the openings 29 of the two outer friction rings 11.

It should be noted here that it is also possible in this embodiment of the friction ring 11 that the two outer friction rings 11 extend up to the area of the cross-sectional tapering(s) 30 and the cross-sectional tapering(s) 30 are formed by a compacted area 20 of both outer friction rings 11. In this case the two outer friction rings 11 each preferably only have one compacted area 20 which is formed on the surface which does not fit on the middle friction ring 11. For example, in these embodiments of the friction assembly 1 (FIG. 1) all of the openings 29 can have the same inner diameter 14.

Furthermore, in the embodiment variant of the friction assembly 1 with a plurality of connected friction rings 11 it is possible that more than three friction rings 11 are provided and connected to one another. In this case the inner friction rings 11 between the two outer friction rings 11 each have an opening 29 of the same size. The cross-sectional tapering(s) 30 are thus formed by one or both outer friction rings 11.

However, it is also possible to provide a plurality of friction rings 11 on at least one side (as viewed in axial direction 4) which have a smaller inner diameter 14 of the openings 29 than the middle friction ring or rings 11.

According to a development of the embodiment variant of the friction ring 11 according to FIG. 9 it is possible that at least one transition between two different cross-sections of the friction ring 11 in the region of the cross-sectional tapering 30 is provided with at least one rounding 35 and/or 36, as shown in FIG. 10.

A radius of the rounding 35 and/or a radius of the rounding 36 can thus be selected from a range with a lower limit of 0.1 mm and an upper limit of 1.2 mm.

Furthermore, reference is made to the explanations relating to the friction ring 11 according to FIG. 9 and the associated embodiments relating to the support ring 27 with the friction segments 28 or the connected friction rings 11, which can also be applied to this embodiment variant of the friction ring according to FIG. 10.

The friction assembly with the friction rings 11 has at least in most embodiment variants the advantage, in addition to the aforementioned advantages, that friction linings do not need to be adhered separately onto a metal carrier. In this way production times can be shorter, as the steps of staining, applying adhesive, prepositioning the carrier are unnecessary. In this way the time required for hardening can also be reduced. Usually the inner discs 2 are used as the carrier. As the latter (like the outer discs 3) no longer have friction linings the carriers can also be used as a heat sink, as there is no lining insulation. In this way it is possible to achieve greater output density or with the same output density as in the prior art with adhered friction linings it is possible to use less installation space.

To produce the friction rings 11 a suitable mixture of raw materials can be applied with the resin onto paper and the latter can thus be impregnated with the resin, after which the resin is hardened. Afterwards, the friction rings 11 are punched out. The compacted areas 20 are preferably formed in the hardened resin. The hardening is a hot-pressing process, in which by means of temperature and pressure in the friction material the remaining cross-links of the resin can be formed and the final thickness adjusted. In this case there is a material flow, i.e. the outside diameter becomes greater, the inner diameter becomes smaller. Performing the hardening prior to punching has the advantage that the size of the friction rings 11 is no longer changed by subsequent processing steps. This has the advantage that both the strength and also the compressibility of the friction ring 11 can be better adjusted over the compacted areas 20 and the non-compacted or less compacted areas 21.

In the invention friction assemblies 1 were tested with regard to their frictional behavior, temperature behavior and the drag torques of the friction rings 11. The results are shown in FIGS. 11 to 13.

The testing was performed on a friction assembly 1 which had six friction rings 11, four outer discs 3 and three inner discs 2. The friction rings 11 of the friction assembly 1 according to the invention and the friction rings of the friction assemblies according to the prior art were made respectively from the same material, like the respective counter-discs in the friction assemblies. The frictional surface of said friction assemblies was 6,268.44 mm². The radius of the friction rings 11 was 58.72 mm.

Figure 11:
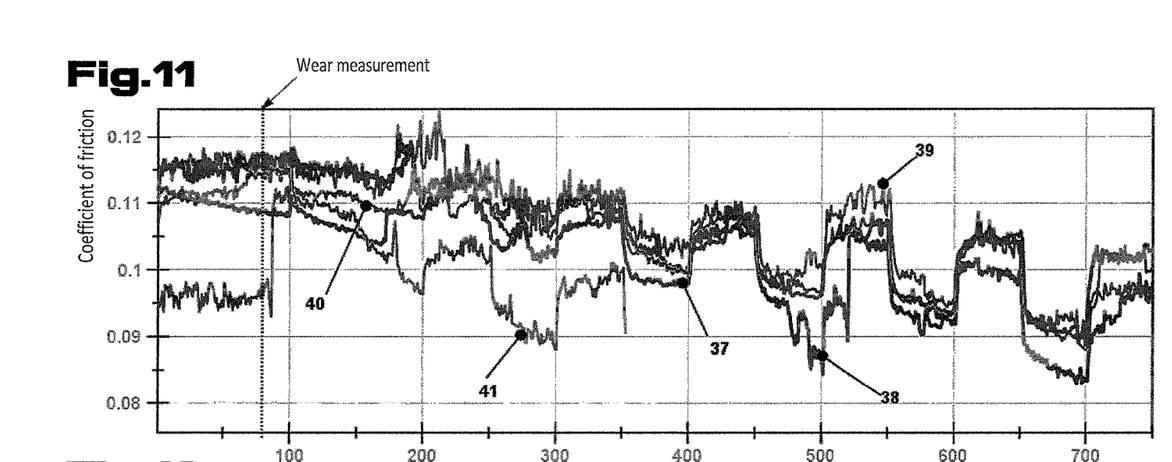
FIG. 11 shows a graphical representation of the comparison of the frictional value of friction assemblies.
Figure 12:
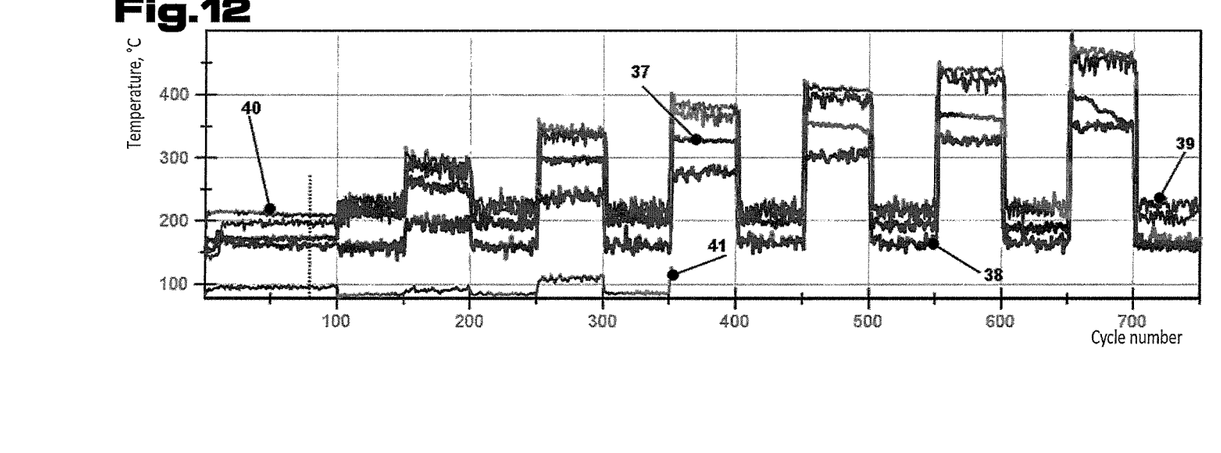
FIG. 12 shows a graphical representation of the temperature behavior of different friction assemblies.
Figure 13:
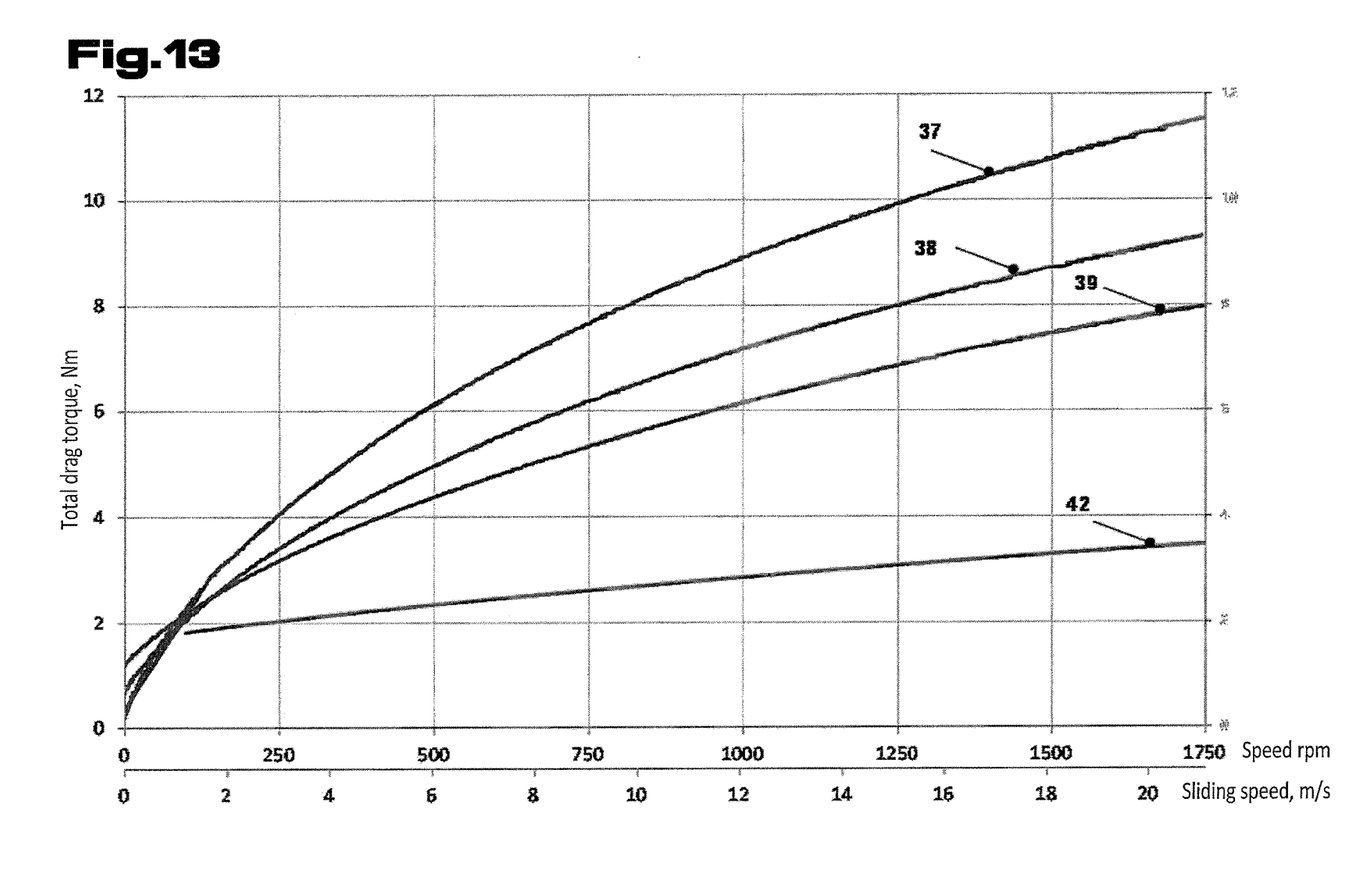
FIG. 13 shows a graphical representation of the curve of the drag torque for different friction assemblies.

A reference friction ring 11 is denoted in FIGS. 11 to 13 by the reference numeral 37.

The reference numeral 38 denotes a friction ring 11 with external guiding, i.e. the guiding of the friction ring 11 in the region of the second component 8.

The reference numeral 39 denotes a friction ring 11 with internal guiding, i.e. the guiding of the friction ring 11 in the region of the first component 5. The friction ring 11 is thus guided with a loose fit.

The reference numeral 40 denotes a friction ring 11 with fixed internal guiding. The friction ring 11 is designed like friction ring 11 with a loose fit.

The reference numeral 41 denotes an inner disc 2 made of steel.

In FIG. 13 the reference numeral 42 denotes measurement without friction rings 11.

Furthermore, in FIGS. 11 and 12 the cycle number is entered on the x-axis. The y-axis in FIG. 11 shows the friction value and in FIG. 12 the temperature in ° C.

FIG. 13 shows on the y-axis in the upper number series the speed in rpm and in the lower number series the sliding speed in m/s. The total drag torque in Nm is entered on the x-axis.

As shown in FIG. 11, the friction ring 11 with the loose internal guiding (reference numeral 39) at least up to about 700 cycles compared to the other friction rings (reference numerals 37, 38, 40) and the inner disc (reference numeral 41) has in part a significantly better friction value.

With regard to the temperature behavior over the number of cycles it can be established that the friction ring 11 with the internal guide (reference numeral 39 and 40) performs worse than the friction ring with the external guide (reference numeral 38) and the reference friction ring (reference numeral 37). However, this can be countered by better cooling, in particular in the region of the internal guide by the cross-sectional tapering 30.

However, the friction ring 11 with the loose internal guide (reference numeral 39) performed significantly better with regard to the drag torque than the friction ring with the external guide (reference numeral 38) or the reference friction ring (reference numeral 37). Standardized to the measurement without friction rings (reference numeral 42) it was possible to save up to a maximum of 44% with the internally guided friction ring 11. The saving is calculated according to the formula $1-M_{friction\ ring}/M_{Reference}=1-(11.5-3.5)/8-3.5)$.

The example embodiments show possible embodiment variants of the friction assembly 1 or the friction ring 11, wherein it should be noted at this point that various different combinations of the individual embodiment variants are possible.

The invention also comprises a friction assembly comprising a plurality of inner discs and a plurality of outer discs, wherein the inner discs and the outer discs are arranged alternately in axial direction, and wherein between the inner discs and the outer discs freely rotatable friction rings are arranged and wherein the inner discs and/or the outer discs can be adjusted relative to one another to form a frictional connection with the friction rings in axial direction, wherein the friction rings are made from at least one resin, containing at least one additive, or a sintered material, wherein the friction rings on a surface facing an inner disc and on a surface facing an outer disc comprise respectively at least one compacted area and at least one non-compacted area and/or at least one area that is less compacted relative to the compacted area.

It is an advantage that this way the friction ring has greater mechanical strength over the at least one compacted area. This advantage outweighs the associated disadvantage that the area of the friction ring mainly available for the frictional connection is reduced, i.e. the at least one area that is not compacted or is less compacted. A positive secondary effect of this is that the compressibility of the friction ring can be adjusted more easily, whereby the frictional behavior of the friction ring itself can be better adjusted to the respective counter disc. By means of the improved mechanical stability a one-piece friction ring can be used without support, whereby the support has a long lifetime. It is also an advantage in this case that the friction ring can be produced with relatively high strength from only one material, wherein the friction ring can be produced more easily as the production process comprises fewer stages. By using only one material the homogeneity of the friction ring can be improved over its whole volume, i.e. the homogenous distribution of the individual components of the material. This in turn has a positive effect on the frictional behavior of the friction ring. By using only one material there is also no risk that when the fictional surface has been used the counter disc comes into friction with a metal support which would cause damage to the counter disc.

According to one embodiment variant of the friction assembly it is the case that at least some of the compacted areas annularly surround less compacted areas or non-compacted areas. It is thus possible to distribute the areas of greater strength over the surface of the friction ring more easily or it is possible vice versa to limit the area of the more compressible areas. In this way it is possible to achieve a better separation of the frictional surfaces during the transition to the opened state of the friction assembly. In addition, in this way the mechanical stability of the non-compacted or less compacted areas can be improved.

Preferably, the compacted areas are designed to be groove-like. This has the advantage, that the compacted areas can also be used additionally for guiding lubricant, whereby the friction ring can be cooled more effectively. In this way the proportion of non-compacted or less compacted areas on the surface of the friction ring can be increased, whereby the efficiency of the friction ring or the friction assembly can be improved.

At least the non-compacted or less compacted areas can have a porosity which is at least 20% and a maximum of 80%, relative to the total density of the material of the friction ring. The non-compacted or less compacted areas can thus have a greater compressibility. This can be used to increase the proportion of compacted areas on the total surface of the friction ring, whereby the mechanical stability of the friction ring can be improved.

According to one embodiment variant of the friction assembly the at least one compacted area on the surface facing the outer disc is offset in circumferential direction of the friction ring to at least one compacted area on the surface facing the inner disc. In this way the compressibility of the friction ring can be better adjusted to a desired degree. Furthermore, it is also possible that the compacted area of a surface supports more effectively the not compacted or less compacted area on the opposite surface of the friction ring, whereby the loadability of the friction ring can be improved.

In addition to improving the (mechanical) stability of the friction ring over the compacted areas to improve the stability of the friction ring it is possible that the at least one additive or at least one of the additives is formed by fibers, wherein at least 50% of the fibers, relative to the total amount of fibers in the friction ring, are oriented at least approximately in the same direction.

According to one embodiment variant of the friction assembly the at least one additive or at least one of the additives can be formed by a wire-like reinforcing element, which is arranged in the region of a radially outer end face and/or in the region of a radially inner end face of the friction ring. In this way the stability of the friction ring can be improved further, whereby the proportion of compacted areas relative to the proportion of non-compacted or less compacted areas can be reduced. In this way, on the one hand the frictional behavior of the friction ring can be influenced, on the other hand in this way because of the greater proportion of not-compacted or less compacted areas on the surface of the friction ring the compressibility of the friction ring can also be adjusted in broad limits.

To reduce drag torques the friction ring can be designed to be wave-like. It is thus possible to reduce the proportion of compacted areas relative to the proportion of non-compacted or less compacted areas so that the efficiency of the friction ring can be improved.

Preferably, the friction ring has a thickness in axial direction which is selected from a range of 0.25 mm to 1.75 mm. If the friction ring is designed to be thicker than 1.75 mm it is possible to improve the mechanical stability of the friction ring, but it has been observed that a lining that is too thick can result in wobbling movements of the friction ring. Said wobbling movement in the opened state of the friction assembly can result in the contact of the friction ring with the surface of the counter disc, whereby the lifetime of the friction ring is reduced significantly. By providing compacted areas to increase the mechanical stability of the friction ring the thickness of the friction ring can be reduced in order to prevent this problem. A friction ring, which has a thickness of less than 0.25 mm, tends to wobble during operation which also reduces the lifetime of the friction ring.

Preferably, the non-compacted or less compacted areas each have an area of a maximum of 2 $cm^2$. On the one hand in this way the proportion of compacted areas on the total surface of the friction ring is increased whereby the mechanical stability can be improved. On the other hand it is also possible that the friction ring and counter disc can be separated more easily, as the sum of the areas which form the frictional connection with the counter discs of the friction set is lower and thus the adhesive friction is also reduced, whereby the problem of the friction ring "getting stuck" on the surfaces of the counter disc can be improved. A positive secondary effect can thus also be achieved in that because of the greater proportion of compacted areas on the friction ring, the cooling of the friction ring can be improved when the compacted areas are designed as grooves.

The aforementioned advantages of achieving the stability and at the same time compressibility of the friction rings can also be achieved in that according to one embodiment variant the friction rings are formed by a support ring and friction segments arranged thereon, whereby the support ring is made of paper. In this way the support ring can be more compacted than the friction segments. In addition, by means of this embodiment variant the cost of the friction ring can be reduced, in that expensive friction segments do need not be produced in one piece, whereby the amount of waste created with one-piece friction rings can be reduced. The friction rings thus consist of a supporting structure, namely the support ring, and a frictional structure, namely the friction segments.

Lastly, it should also be noted that for a better understanding of the structure of the friction assembly 1 or the

LIST OF REFERENCE NUMERALS

| | |
|---|---|
| 1 | friction assembly |
| 2 | inner disc |
| 3 | outer disc |
| 4 | direction |
| 5 | component |
| 6 | internal toothing |
| 7 | external toothing |
| 8 | component |
| 9 | external toothing |
| 10 | internal toothing |
| 11 | friction ring |
| 12 | outside diameter |
| 13 | end face |
| 14 | inner diameter |
| 15 | surface |
| 16 | surface |
| 17 | end face |
| 18 | surface |
| 19 | surface |
| 20 | area |
| 21 | area |
| 22 | groove |
| 23 | fiber |
| 24 | reinforcing element |
| 25 | depth |
| 26 | thickness |
| 27 | support ring |
| 28 | friction segment |
| 29 | opening |
| 30 | cross-sectional tapering |
| 31 | width |
| 32 | total width |
| 33 | height |
| 34 | total height |
| 35 | rounding |
| 36 | rounding |
| 37 | reference friction ring |
| 38 | friction ring with external guide |
| 39 | friction ring with internal guide |
| 40 | friction ring with internal guide |
| 41 | inner disc |
| 42 | measurement without friction rings |

The invention claimed is:

1. A friction assembly comprising a first component and a second component as well as a plurality of inner discs and a plurality of outer discs,
   wherein the inner discs are arranged on the first component and the outer discs are arranged on the second component,
   wherein the inner discs and the outer discs are arranged alternately in an axial direction,
   wherein between the inner discs and the outer discs respectively a first freely rotational friction ring is arranged which comprises an opening with an inner diameter,
   wherein the inner discs and/or the outer discs can be adjusted relative to one another to form a friction connection with the first freely rotational friction ring in the axial direction,
   wherein the first freely rotational friction ring is guided in the region of the inner diameter on the first component,
   wherein the first freely rotational friction ring is arranged at a distance from a surface of the first component, and
   wherein said distance is at least 0.05 mm and a maximum of 3 mm.

2. The friction assembly as claimed in claim 1, wherein the first freely rotational friction ring in a region of the opening has a cross-sectional tapering.

3. The friction assembly as claimed in claim 2, wherein a transition between two different cross-sections in an area of the cross-sectional tapering is provided with at least one rounded portion.

4. The friction assembly as claimed in claim 2, wherein the first friction ring is made from at least one resin, containing at least one additive, or a sintered material, and
   wherein the cross-sectional tapering is formed by a compacted area.

5. The friction assembly as claimed in claim 2, wherein the first friction ring is formed by a support ring and friction segments arranged thereon, and
   wherein the support ring has a thickness in the axial direction which corresponds to a thickness of the cross-sectional tapering in the axial direction.

6. The friction assembly as claimed in claim 1, wherein a surface of the first friction ring facing the outer disc and a surface of the first friction ring facing the inner disc have an arithmetic average roughness value Ra according to DIN EN ISO 4287:1998 of a maximum of 12.5 µm.

7. The friction assembly as claimed in claim 1, wherein a ratio of an outside diameter of the first friction ring to the inner diameter of the first friction ring is at least 1.2.

8. The friction assembly as claimed in claim 1, further comprising a second freely rotational friction ring between the inner discs and the outer discs, the second freely rotational friction ring being connected together with the first freely rotational friction ring.

9. The friction assembly as claimed in claim 8, further comprising a third freely rotational friction ring arranged between the inner discs and the outer discs,
   wherein the third freely rotational friction ring is a middle friction ring between the first friction ring and the second friction ring, and
   wherein an opening of the middle friction ring to form the cross-sectional tapering has a smaller inner diameter than the opening of the first friction ring and an opening of the second friction ring.

* * * * *